United States Patent Office 2,827,853
Patented Mar. 25, 1958

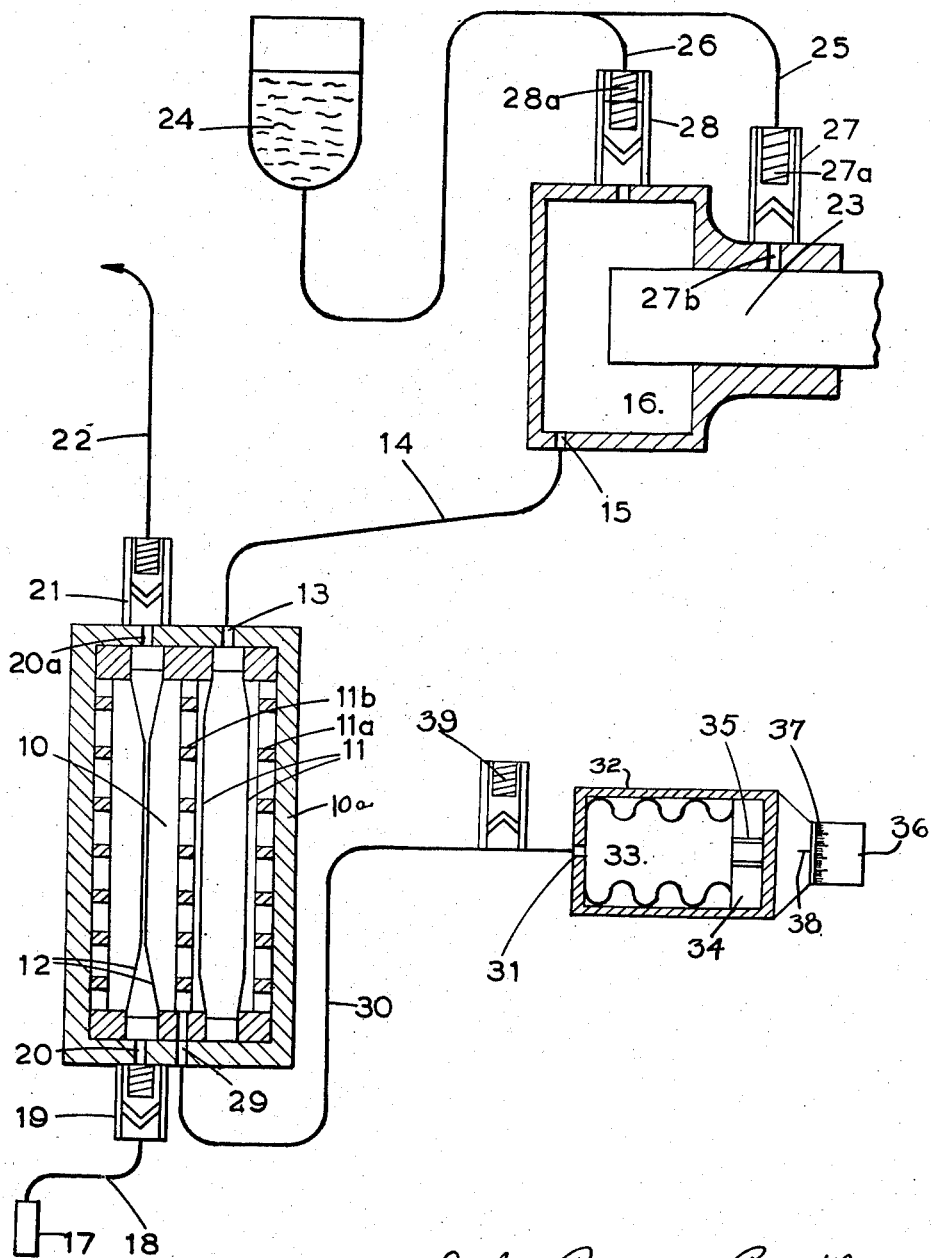

2,827,853
PUMPS FOR METERING LIQUIDS

John Ramsay Bradley, Grantham, England, assignor to Kontak Manufacturing Company Limited, Grantham, England, a British company Application April 8, 1955, Serial No. 500,176

Claims priority, application Great Britain April 15, 1954

6 Claims. (Cl. 103—37)

This invention is for pumps for metering liquids and is particularly suitable for applications where it is desirable to be able to operate and control the delivery of the pump from a position remote from the pump and in which the liquid being pumped is dangerous or harmful; but the invention is not so limited in its uses.

According to this invention there are provided a main pump member giving alternately a pressure and a suction stroke, an expandable and contractable chamber (the actuating chamber) to which and from which liquid is delivered and withdrawn by said pressure and suction strokes, a second expandable and contractable chamber (the delivery chamber), valve means through which liquid is drawn when such chamber expands and other valve means through which it is delivered when such chamber contracts, a third chamber (the buffer chamber) filled with liquid by which the pulsations of the actuating chamber are transmitted to the delivery chamber, to cause expansion and contraction of that chamber valve means in communication with said main pump chamber one of which will open to admit liquid on the suction stroke of said pump when a preselected position is reached and the other of which will open to allow the escape of liquid on the pressure stroke of said pump when said pressure exceeds preselected value which is reached at the mechanical limit of travel of the delivery chamber and means for controlling the pump delivery by controlling the volume of the buffer chamber.

Preferably the main pump member is driven at a constant stroke and means are provided for varying at will the delivery from the delivery chamber by varying the volume of liquid in the buffer chamber and for indicating the variations of volume on a scale.

Both the main pump member and the said volume control member may be at a point or points remote from the said actuating buffer and delivery chambers.

With such apparatus the amount of liquid delivery by the pump will be dependant upon the speed of stroke of the main pump member and the volume of liquid taken in and delivered from the delivery chamber, and the latter will be dependant upon the amount of liquid in the buffer chamber. If therefore the main pump member works at constant speed the pump delivery on each pump stroke will vary only with the quantity of liquid in the buffer chamber.

Preferably the volume of liquid in the buffer chamber is varied by varying the size of an expandable and contractable chamber which is connected to the buffer chamber by a capillary pipe line which will thus avoid any errors due to the effects of liquid head in the system.

This capillary line can be taken to any convenient place removed from the working members of the pump.

The actuating and delivery chambers may be placed inside the buffer chamber.

Any convenient liquid such as oil may be used for the system comprising the actuating pump and actuating chamber and for the buffer chamber. The main pump system is completely separated from any dangerous liquid which passes through the delivery chamber and any escape from the delivery chamber will again be isolated in the buffer chamber from the main pump system.

An example of this invention is illustrated diagrammatically in the accompanying drawing.

In a casing 10a is a buffer chamber 10 filled with a liquid.

Extending across the chamber 10 and fixed to its walls at their peripheries are two pairs of flexible diaphragms 11 and 12 constituting respectively actuating and delivery chambers.

The actuating chamber 11 communicates through a hole 13 in casing 10a, pipe line 14 and hole 15 with the interior of cylinder 16 which is filled with a liquid which may be oil.

The delivery chamber 12 communicates at its lower end with a source of supply of the liquid to be pumped shown at 17 via pipe 18 spring loaded non-return valve 19 and hole 20 in casing 10a and at its upper end via hole 20a, spring loaded non-return valve 21 and pipe 22 with the place to which the liquid is to be delivered.

In cylinder 16 reciprocates a piston 23 having a fixed stroke. Cylinder 16 also communicates with liquid reservoir 24 through pipes 25 and 26 and spring loaded non-return inlet valve 27 loaded by spring 27a and spring loaded non-return outlet valve 28 loaded by spring 28a.

The spring loading on valves 27 and 28 determines the limits of pressure within which will work the system constituted by the main pump, the actuating chamber and the parts connecting the same and the buffer chamber and connected parts. The upper limit of pressure is determined by the pressure at which the said valve 28 will open, and this is arranged to open only when the delivery chamber has reached the mechanical end of its delivery stroke by the two diaphragms coming together as shown in the drawing.

The inlet valve 27 is so placed that it will not open until its port has been uncovered by the piston and a depression approaching that of an absolute vacuum may be permitted before this port opens.

The interior of casing 10a communicates via hole 29, capillary pipe 30 and hole 31 with the interior of casing 32.

Inside casing 32 is an expandable and contractable box 33 in this case formed by a metal bellows, the left hand end of which is formed by the left hand end of casing 32 and the right hand end of which is formed by a plate 34 which is displaceable axially of the casing through a hollow pin 35 internally threaded to receive a threaded pin not shown on the end of which is a knurled head 36, on which is a scale 37 cooperating with a fixed mark 38 on the casing 32. A bleed valve 39 is provided to pipe 30 for filling purposes.

The way the apparatus works is as follows:

Piston 23 has a constant stroke and is driven at a constant speed.

On its suction stroke piston 23 will cause actuating chamber to be exhausted through pipe 14. Delivery chamber 12 will accordingly fill. The suction stroke of piston 23 is continued beyond the point at which delivery chamber 12 is filled, and this will draw liquid into the pump cylinder through valve 27. The loading on valve 27 is greater than on valve 19 which ensures that delivery chamber 12 fills first before valve 27 opens.

On its return pressure stroke piston 23 refills actuating chamber 11 through pipe 14. Delivery chamber 12 will thus be exhausted through valve 21. The piston stroke is continued beyond the point at which chamber 12 is exhausted at which point valve 28, more heavily loaded than valve 21 will open to return working liquid to reservoir 24.

It will be appreciated that the capacity of the two chambers 11 and 12 is dependant upon the amount of liquid in buffer chamber 10. This can be regulated through expandable chamber 33 which together with capillary pipe 30 forms with chamber 10 a closed system. If the plate 34 is displaced to the left liquid will move along pipe 30 into buffer chamber 10 and this liquid will be accommodated in the buffer chamber by a reduction of capacity of the chambers 11 and 12. If the plate 34 is displaced to the right this conversely increases the capacity of the two chambers 11 and 12. The delivery from the system can be regulated and measured by the knurled head 36 and its associated scale which will record the position of plate 34 and can be calculated in volume of delivery per unit of time.

It will be appreciated that where the apparatus is used to deliver a dangerous liquid, the system provides for a completely remote control and the buffer chamber 10 provides a barrier into which any escape of the dangerous liquid will pass without reaching the liquid in the main pump and actuating chamber system.

In operating below a fixed pressure limit, all parts of the system subject to hydraulic pressure from the main pump member are subjected to exactly the same stresses at the beginning and end of each pumping stroke, and in consequence elastic distortions of these parts are always the same at each end of each stroke. In consequence there is no change in the characteristics of the pump due to these distortions, irrespective of the delivery pressure or the rate of delivery against which the pump is operating. Under these conditions, the quantity delivered from the delivery chamber by the pump per stroke is accurately determined by the volume of the buffer chamber, and by no other variable except possibly temperature changes.

What I claim is:

1. A liquid metering pump system which comprises a main pump having means reciprocable in a rigid wall-enclosed chamber to give alternate pressure and suction strokes, an actuating chamber having walls at least one of which is movable for chamber contraction and expansion, said second chamber being connected to the first chamber, a first liquid filling said chambers and connection, and delivered to and withdrawn from the second chamber by said pressure and suction strokes, a delivery chamber having walls at least one of which is movable for chamber contraction and expansion, an inlet valve connected to said last chamber for supplying a second liquid thereto when expanded and a discharge valve through which the second liquid is delivered when the last chamber is contracted, rigid means forming a closed buffer chamber filled with a third liquid immersing at least the movable walls of said actuating and delivery chambers whereby the pulsations of the movable wall of the actuating chamber are transmitted to the movable wall of the delivery chamber through said third liquid to cause expansion and contraction of the latter, valve means in communication with said main pump chamber in such a manner that one will open to admit liquid only after a predetermined position of the suction stroke of said pump is passed, and another will open to allow escape of the liquid when the pressure stroke of the pump produces a preselected pressure at the mechanical limit of travel of the delivery chamber, and means to control the ratio of volume of the third liquid in the buffer chamber to the volume of the chamber to regulate the pump delivery rate.

2. A pump as claimed in claim 1 in which the main pump is driven at constant speed and stroke.

3. A pump as claimed in claim 1 in which means are provided for selectively varying the volume of liquid in the buffer chamber.

4. A pump as claimed in claim 3 in which the means for varying the volume of liquid in the buffer chamber consists of an expandable and contractable chamber connected with the buffer chamber by a capillary pipe line, and means to adjust the volume of the last mentioned chamber.

5. A pump as claimed in claim 4 in which the said chamber is constituted by a metal bellows having a movable part which cooperates with a scale which measures the pump delivery in units of volume per unit of time, and means to move said part.

6. A pump as claimed in claim 1 in which the actuating and delivery chambers are placed inside the buffer chamber and expand and contract by means of flexible walls.

References Cited in the file of this patent

UNITED STATES PATENTS

| 2,228,292 | Wood | Jan. 14, 1941 |
| 2,313,551 | Hurlbut | Mar. 9, 1943 |
| 2,713,827 | Hoop | July 26, 1955 |

FOREIGN PATENTS

| 7,172 | Great Britain | of 1890 |
| 287,267 | Great Britain | Mar. 22, 1928 |
| 673,850 | France | Jan. 20, 1930 |